DEVICE FOR INTERRUPTING THE FLOW OF ELECTRICAL CURRENT IN MOTOR VEHICLES
Filed April 6, 1966 2 Sheets-Sheet 1
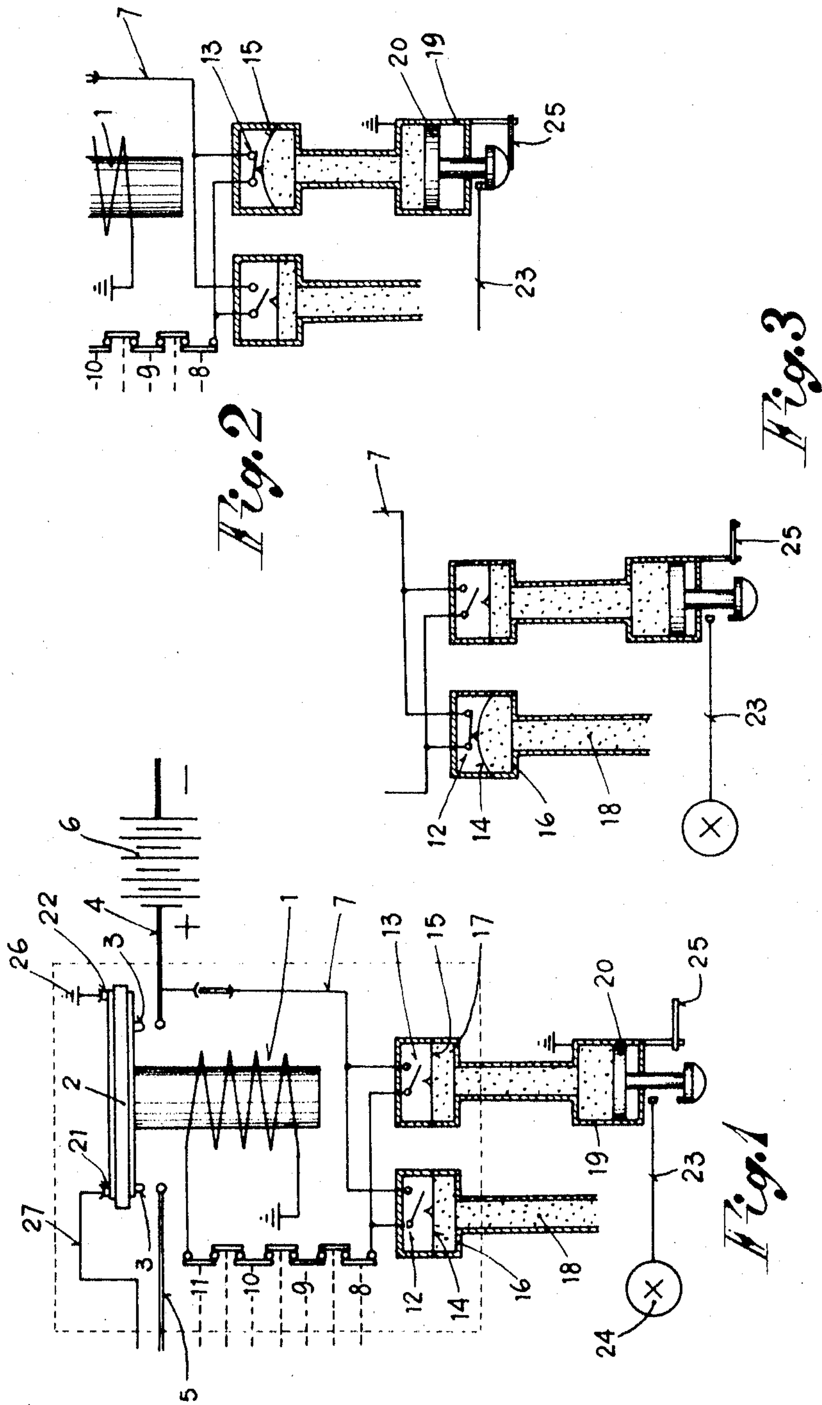

Fig. 4
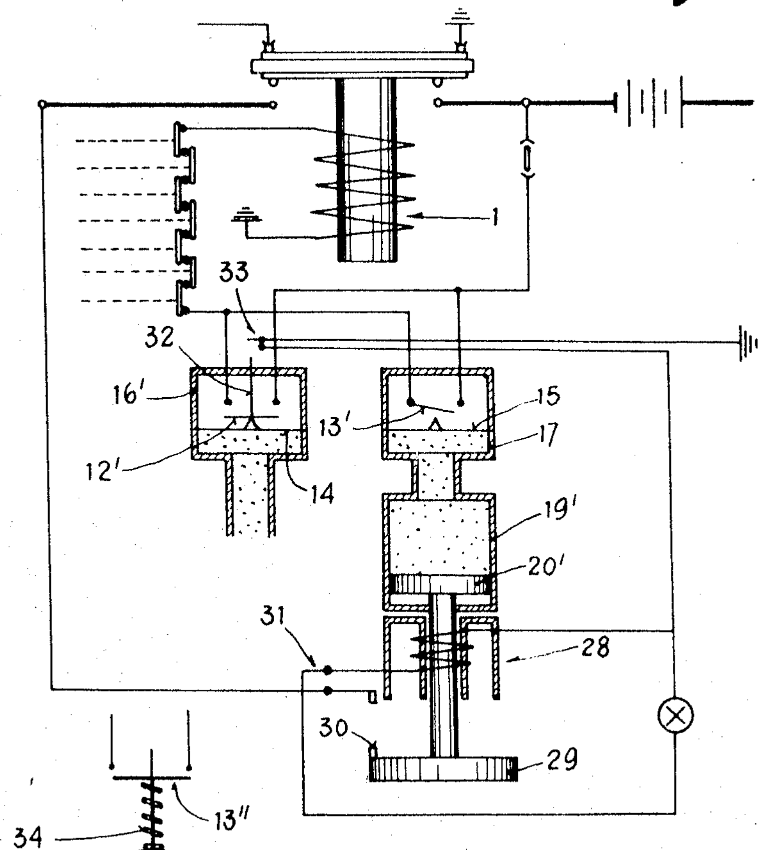
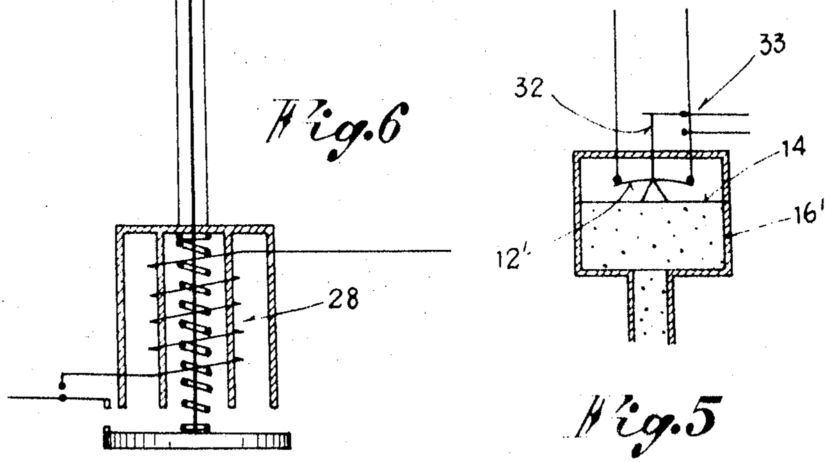
Fig. 6
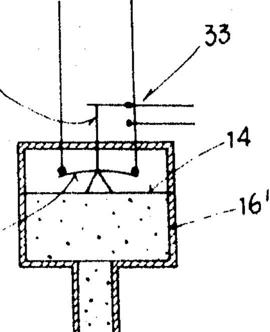
Fig. 5

United States Patent Office 3,459,954

Patented Aug. 5, 1969

3,459,954

DEVICE FOR INTERRUPTING THE FLOW OF ELECTRICAL CURRENT IN MOTOR VEHICLES

Ero Sgorbani, 40 Via XX Settembre, Fiorenzuola, d'Arda, Piacenza, Italy

Filed Apr. 6, 1966, Ser. No. 540,637
Claims priority, application Italy, Apr. 10, 1965, 757,360
Int. Cl. H02j *1/04*
U.S. Cl. 307—10 3 Claims

ABSTRACT OF THE DISCLOSURE

An on-off electrical switch opens and closes the circuit from the positive terminal of the battery used with an internal combustion engine. An electromagnet, that is connected to the positive terminal of the battery, is energized by the passage of electrical current which is determined and controlled by the switch. In one embodiment, the switch is first actuated by the fluid of a manually operated auxiliary pump and then by the pressure of the oil circulating in the engine.

The present invention is related to an automatic device for interrupting the current flow in auto vehicles and, more particularly to an automatic electrical switching device connected to the battery terminal of auto vehicles, preferably the positive terminal of said battery.

The device of the invention is characterized by an on-off electrical switch to open and close the electrical circuit on the wire from the positive terminal of the battery, which terminal is thus connected to an electromagnet, the energization of which depends on the passage of electrical current determined and controlled by a switch which, in turn, is actuated first by the fluid of an auxiliary pump manually operated (for the initial starting phase of the engine of the auto vehicle) and, then by the pressure of the oil circulating in the engine and by the pressure indicator positioned on the dashboard (when the motor is in a normal phase of operation).

The switch of the invention, which is provided furthermore with additional means for the interruption of the electrical current in the main circuitry of the auto vehicle with the consequent elimination of fire hazards, is clearly shown in the accompanying drawings, of which:

FIGURE 1 represents schematically the assembly of the device of the invention in an open-circuit position;

FIGURES 2 and 3 represent in detail the energized position of the electromagnet for the closing of the circuit in the initial starting phase and in the normal operating phase of the engine, respectively, and FIGURES 4, 5 and 6 represent two variances of construction of the automatic actuating means of the auxiliary pump.

With reference to the drawings of FIGURES 1, 2 and 3, the automatic switch of the invention comprises an electromagnet 1 provided with an anchor 2, the contacts 3 of which (connected to each other) actuate the contacts of the two wires 4 and 5. The wire 4 is connected to the positive terminal of the battery 6. The current wire 7 of the electromagnet 1 is connected to wire 5 and has interplaced therebetween a plurality of switches 8, 9, 10, 11 and the two switches 12 and 13. The switches 12 and 13 are actuated by the membranes 14 and 15 which are positioned within the two small fluid containers 16 and 17. The fluid in these containers may be, for example, oil. The first container 16 is in fluid communication through conduit 18 with the conduit (not shown) of the oil to the pressure indicator located on the dashboard of the auto vehicle. The second container 17 is in fluid communication with the auxiliary pump 19 which is provided with a piston 20 actuated either manually or through a foot pedal.

The device of this invention, when the engine is at rest, shows the wires 4 and 5 disconnected (see FIGURE 1), that is to say, the main current path battery-wiring is disconnected. To start the engine it is, therefore, necessary to establish a passage of current from the battery 6 to the wire 5. Such passage of current is obtained by actuating the piston 20 of the auxiliary pump 19. The fluid contained therein (it may be, for example, water containing an antifreezing compound) actuates the membrane 15, which actuates, in turn, the switch 13. Switch 13 then causes the current to pass from the battery 6 to the electromagnet 1 (see FIGURE 2) with the consequent displacement of the anchor 2 in the position in which the contacts 3 (interconnected, as stated before) establish a contact between the wire 4 of the battery and the wire 5 of the main circuit.

Following the normal operation of the engine, the oil circulating therein passes also the container 16 of the device of the invention and actuates the membrane 14. This in turn, actuates the switch 12, which keeps closed the energization circuit of the electromagnet. At this point, the manual operation of the auxiliary pump 19 becomes superfluous and is nulled, because the circuit is maintained by the very action of the engine, in the condition represented by FIGURE 3.

If now, for any reason whatever, voluntary or accidental, the engine is arrested, the main circuit is interrupted between wires 4 and 5, because the lack of oil pressure in the container 16 does not actuate the membrane 14 and opens the corresponding switch 12 with the consequent interruption of the passage of current to the electromagnet 1, the anchor 2 of which is displaced from the contacts of the wires 4 and 5.

At this point, therefore, the auto vehicle is completely without electrical energy, because it is fully isolated electrically. Thus, such hazards as fire or explosion are automatically eliminated.

The device of the invention is completed in its components by two contacts 21 and 22, interconnected to each other, located on the anchor 2 of the electromagnet; by the wire 23 which connects the piston 20 of the auxiliary pump 19 to a light indicator 24 to indicate the manual starting phase of the piston 20, which may be constituted, for example, by a lever. The purpose of means 25 is to arrest the piston in the engine manual starting position. The purpose of contacts 21 and 22 is to connect, when the main circuit is open, the ground 26 to the wire 27, which is, in turn, connected to the energization field of the dynamo or to the distributor or to the magneto, so as to cut off the functioning of these generators.

It is worth observing the particular function of the switches (indicated by numerals 8–11) upon the energization circuit of the electromagnet 1 and, consequently, on the main circuit of the auto vehicle. On these switches one may connect, for example, the thermostat for the cooling medium of the engine; the thermostat for the engine temperature; a photoelectric cell calibrated as a function of the maximum speed of the vehicle; the circuity of the radio receiver which may be, for example, transistorized and tuned to a precise wave length; and others. All of these devices or accessories may interrupt the current for the energization of the electromagnet, with the consequent interruption of the main circuit, arresting of the engine and, therefore, of the car, whenever the temperature of the cooling system, or of the engine exceeds a predetermined level, or when the speed of the vehicle is excessive or, in the case of the radio receiver circuitry, when the police desires to stop by remote control one or more cars travelling within the radio transmitting range.

In a variance of the device of the invention (see FIGURE 4) the auxiliary pump 19' is provided with the piston 20' the stem of which is actuated by an electromagnet 28. This has the function of keeping the piston in the position where the switch 13' closes the circuit and allows the current to pass from the battery to the electromagnet 1. This piston 20' is moved manually by pressing on knob 29, which, in turn, causes with anchor 30 the closing of the electric circuit on the electromagnet 28 by means of contacts 31.

According to the above-described variance, the pump 16' is provided with the switch 12' which has an elongated stem 32. Stem 32, when the switch 12' is brought by the pressurized fluid into the position of a closed circuit (see FIGURE 5), interrupts the connection of the contacts 33, thus opening the circuit of the electromagnet 28. At this point, the piston 20' of the pump 19' returns to the resting position, thus freeing the switch 13'.

In a second variance of the construction of the device of the invention (see FIGURE 6), the auxiliary pump may be eliminated and the actuation of the switch 13'' is effected by means of the metallic wire 34 which is connected to the displaceable means of the electromagnet 28, hereabove described with reference to FIGURE 4.

What is claimed is:

1. In combination with an internal combustion engine, a battery and a source of pressurized fluid, a device for isolating the battery from the electrical circuitry of the engine, said device comprising:

(a) a first electromagnet having a pair of normally open contacts that are movable to a closed position for defining a continuous electrical path between the positive terminal of the battery and the electrical circuitry of the engine;

(b) a first, normally open switch electrically connected to said first electromagnet and the positive terminal of the battery, said first, normally open switch comprising:

(1) actuating means including a piston for closing said first, normally open switch and to move the contacts of said first electromagnet to said closed position; and (2) a second electromagnet means connected to the positive terminal of the battery and said piston to displace said piston when said electromagnet means is activated, means connected to said piston for activating said electromagnet, said first, normally open switch being manually displaced during the starting phase of the engine and maintained in said displaced position at that time by said second electromagnet;

(c) a second, normally open switch electrically connected to said first electromagnet and to the positive terminal of the battery; and means included in said second switch for closing said second switch and for deactivating said second electromagnet on normal operation of the engine.

2. The device in accordance with claim 1 wherein said closing means for second, normally open switch comprises:

(a) a second receptacle in fluid connection with the source of pressurized fluid; and (b) a second membrane contained within said second receptacle, said second membrane being displaced by the pressurized fluid only during normal operation of the engine to close said second, normally open switch.

3. The device in accordance with claim 1 wherein said actuating means for said first, normally open switch comprises a wire coupled to said second electromagnet and said second normally open switch.

References Cited

UNITED STATES PATENTS

| | | | |
|---|---|---|---|
| 2,345,023 | 3/1944 | Yarbrough. | |
| 1,896,459 | 2/1933 | Mullin. | |
| 2,162,174 | 6/1939 | Jones. | |
| 2,191,216 | 2/1940 | Mendez. | |
| 2,210,044 | 8/1940 | Schirokaur. | |
| 2,370,249 | 2/1945 | Korte et al. | |
| 2,423,728 | 7/1947 | Ray. | |
| 2,504,670 | 4/1950 | Everest. | |
| 2,581,737 | 1/1952 | West. | |
| 2,779,878 | 1/1957 | Daunoras | 307—10 |

ROBERT K. SCHAEFER, Primary Examiner

D. SMITH, Jr., Assistant Examiner

U.S. Cl. X.R.

200—82; 123—198